Patented Apr. 23, 1935

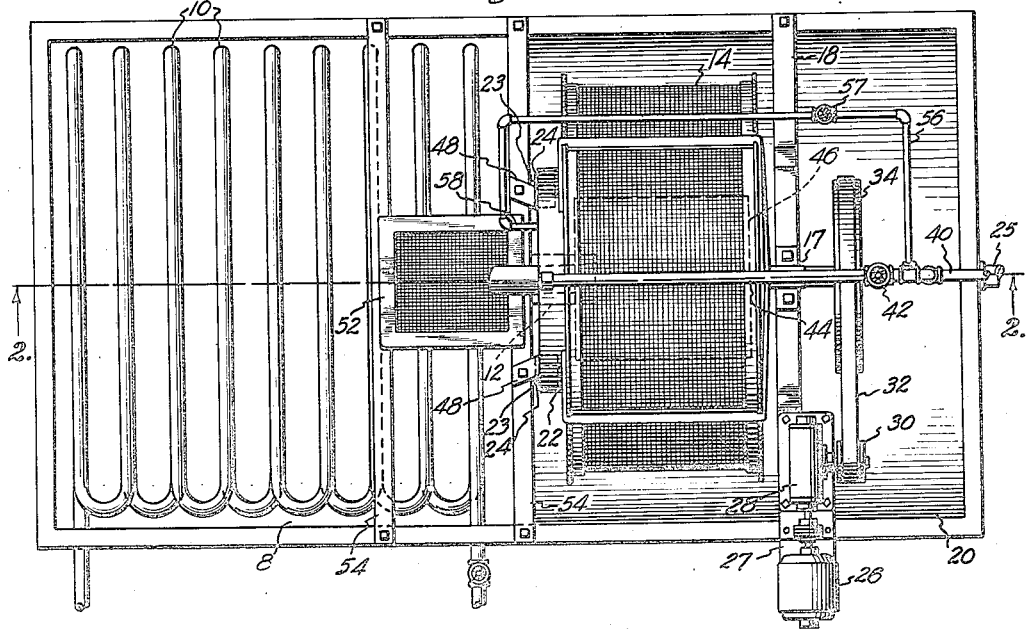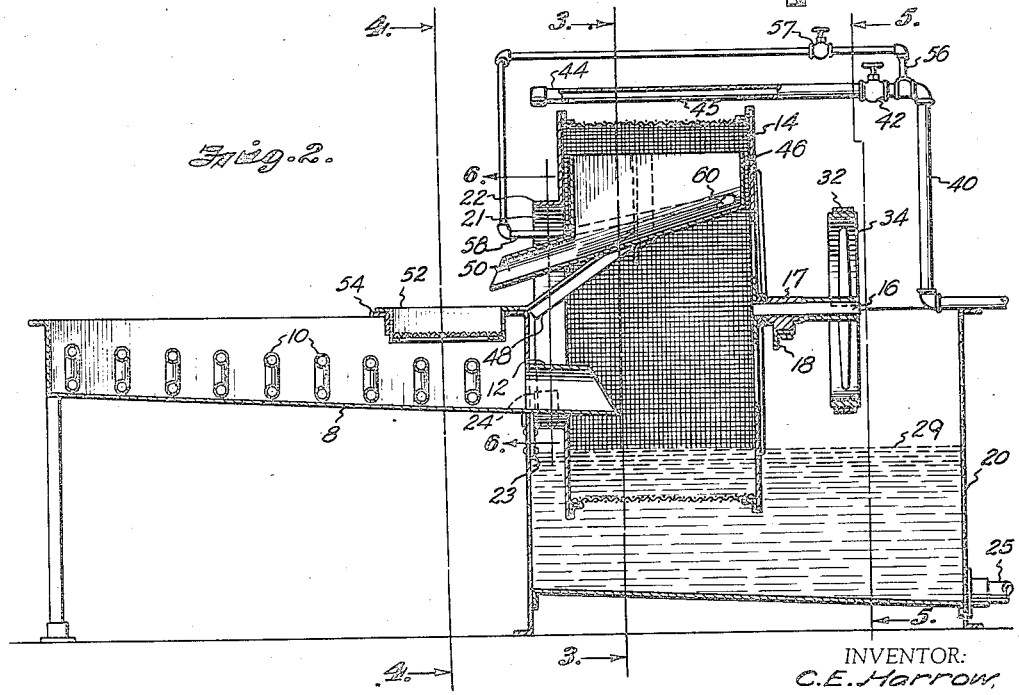

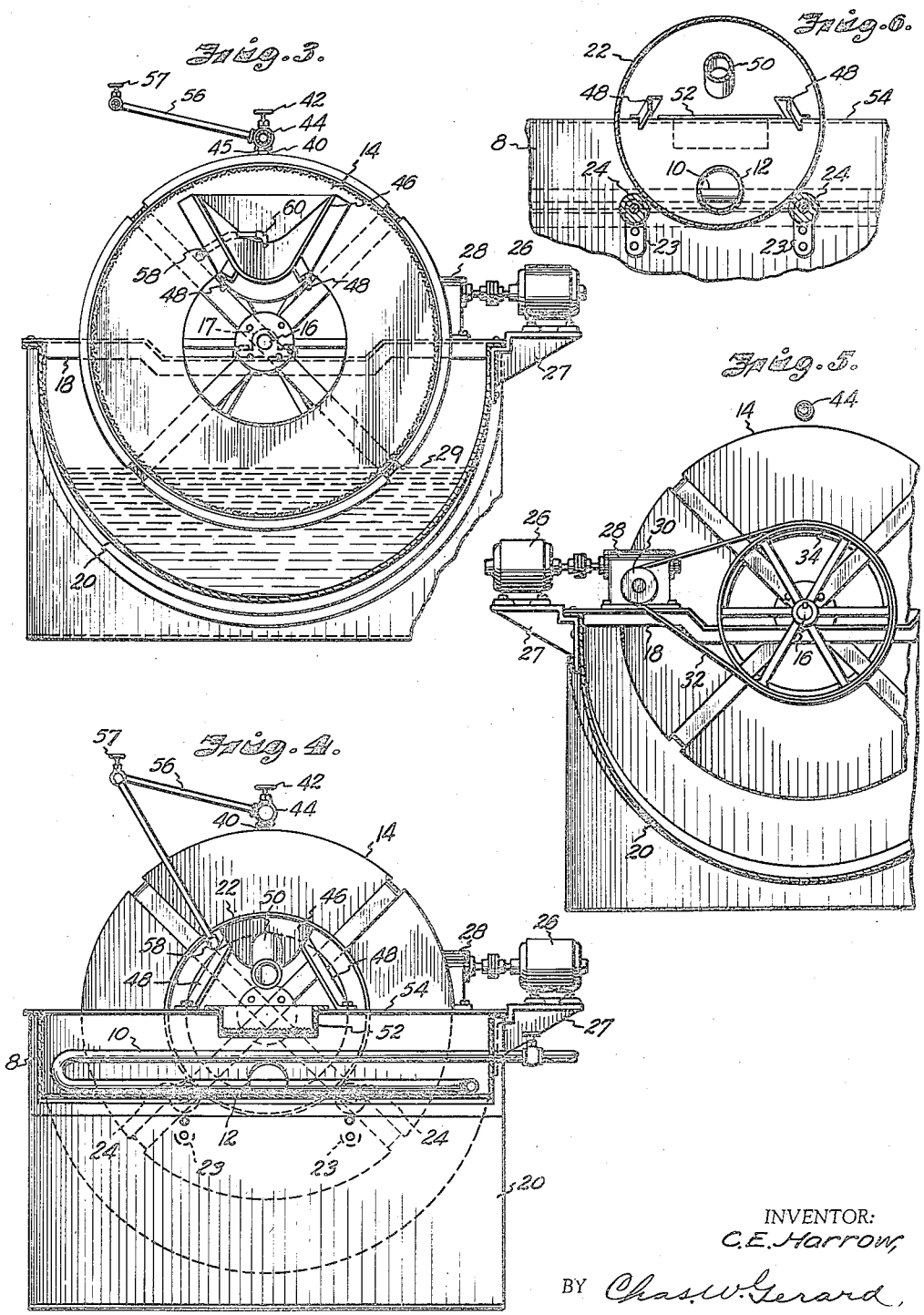

1,998,622

UNITED STATES PATENT OFFICE 1,998,622

METHOD OF PURIFYING CREAM

Cecil E. Harrow, Kansas City, Mo.

Application July 23, 1934, Serial No. 736,524

1 Claim. (Cl. 210—199)

The present invention relates to operations for removing undesired substances from cream or the like in creamery and dairy plants, and the primary object therefore is to provide a suitable method or process for effecting the removal of such ingredients as curd, sediment and any objectionable impurities from the cream in an expeditious and efficient manner.

For the accomplishment of this purpose, the present invention provides for the cleaning treatment of the cream prior to any pressure straining operation, or any other treatment involving a pumping operation,—thereby avoiding any objectionable disintegration of the undesired ingredients or impurities, and accordingly effects their removal by an efficient separating operation which first reduces the cream to a free-flowing condition and thereafter conducts it through a fine-mesh continuously operated screening equipment which removes the ingredients and substances which it is desired to eliminate from the cream.

As one practical form of embodiment of the invention for this purpose, I provide a receptacle for receiving the cream which is dumped therein and warmed to a proper free-flowing consistency, and a continuously operated screening device which receives the cream as it flows by gravity from the warming receptacle, and effects the removal of the substances above referred to and which are to be eliminated from the cream, and prior to the flow of the cream from said device to the other equipment of the plant. This device is preferably self-cleaning, and effectively separates from the cream all those ingredients and substances which would merely undergo a disintegration process under the action of the pumps and pressure straining equipment.

With the foregoing general objects in view, as well as minor objects as will hereinafter appear, the invention will now be described in detail by reference to the accompanying drawings illustrating one practical form of equipment which has been found suitable for the practice of the principles of my invention, after which those features and combinations deemed to be novel and patentable will be particularly set forth and claimed.

In the drawings—

Figure 1 is a plan view illustrating a cream straining and purifying apparatus constructed in accordance with the principles of the present invention;

Figure 2 is a vertical sectional view, representing a section taken on the line 2—2 of Figure 1; and Figures 3, 4, 5 and 6 are vertical sectional views representing sections taken on the lines 3—3, 4—4, 5—5, and 6—6, respectively, of Figure 2.

Referring now to the said drawings in detail, these illustrate the apparatus as comprising a cream receiving vat 8 in which are located a series of cream-warming coils 10 for the circulation of a suitable warming medium, such as hot-water, for raising the temperature of the cream in its initial stage to a free-flowing consistency, preparatory and suitable for the efficient action of the screening device to which the cream is conducted by way of a spout 12 forming a discharge outlet from said vat 8.

This screening device comprises a suitably constructed cylindrical screen member 14 supported for rotating movement by a shaft 16 projecting axially from one side of the cylinder 14 and journaled in a bearing 17 carried by a frame member 18 extending across the top of a second vat 20. The opposite side of said cylinder is formed with a circular opening 21 surrounded by an outwardly projecting flange 22 supported by rollers 23 journaled on bracket elements 24 secured to the corresponding side of the vat 20. The arrangement and construction are such that the spout 12 projects from the vat 8 through the opening 21 into the interior of the cylinder 14, and the latter is so supported that its lower half extends somewhat below said discharge spout 12 into more or less close proximity to the bottom of the vat 20. Preferably both of the vats are provided with similarly inclined bottoms, to promote the flow of the cream by gravity from the vat 8 into the cylindrical screen member 14 and the vat 20, and from the latter by way of the discharge outlet 25,—as illustrated in Figure 2.

The cylindrical screen is kept in continuous rotation during the screening operation by means of any suitable drive mechanism, such as a motor 26 supported on a shelf 27 attached to the top of the vat 20, and operating a reducing gear 28 provided with a pulley 30 for operating a belt 32 passing over a pulley 34 secured to one end of the shaft 16 (see Figures 1 and 5).

Above the vat 20 is arranged a steam pipe line 40 provided with a valve 42 and a terminal portion 44 extending parallel to the axis of the screen cylinder 14 and projecting over the top of said cylinder, and also formed with a steam discharge slit 45 in position to discharge a longitudinal jet of steam upon the screen mesh as the cylinder passes under said terminal pipe portion 44 (see Figure 2). By this means the wire mesh of the screen is cleaned, at every turn of the cylinder, of the sediment and other substances trapped from the cream discharged into the cylinder through the spout 12, the substances thus freed from the cream dropping into a collecting trough or receptacle 46 supported by frame pieces 48 (see Figures 2–4) extending through the opening 21 for positioning said trough inside the screen cylinder 14 and adjacent to the interior top portion thereof.

This trough or receptacle 46 is formed with a sloping bottom and a discharge spout 50 projecting out through said opening 21 into position for discharging into an auxiliary screen 52 in the form of a screen-bottomed tray which is removably mounted upon a pair of spaced cross-frame members 54 extending over the top of the vat 8 for enabling the screenings from the screen cylinder to be drained into the vat 8 and the auxiliary screen 52 also to be removed from time to time for cleaning purposes.

A branch steam pipe 56 is also connected with the steam line 40 and provided with a valve 57 and a terminal portion 58 projecting through the opening 21 and into the interior of the trough or receptacle 46 for positioning a steam jet nozzle 60 at the upper margin of the inclined bottom of said receptacle,—said nozzle discharging in the direction of the spout 50, whereby the action of the steam jet is effective in keeping the trough or receptacle clean of all the substances discharged thereinto from the screen cylinder 14 under the action of the steam issuing from the slit 45 in the pipe terminal 44.

In the treatment of cream as the practice is now generally carried out in dairy and creamery establishments, the cream is always subjected to a pumping action prior to its being conducted under pressure through the straining or screening apparatus. Under such conditions it is of course unavoidable that any particles of foreign matter, including small insects and the like which inevitably find their way into the cream, are subjected to a forcible macerating and disintegrating action while passing through the pumping apparatus, and are thus reduced to such a fine state that they will (to a greater or less extent) pass readily through the screen or strainer device, or under the force of pressure created by the pump are driven on through such screening or straining equipment.

Thus the foreign matter referred to, although its presence in the screened product may not be observable except on microscopic examination, due to its finely divided state, is not in fact eliminated, and it is accordingly the object of the present invention—by means of the equipment above described— to carry out the purifying operation by such procedure that the objectionable features of the prevailing practice may be overcome in a highly efficient manner.

In the operation of this apparatus, the cream on being dumped into the receiving vat 8 is heated by the coils 10 to a proper free-flowing consistency, and flows by gravity through the spout 12 into the revolving screen. The cream in the vat 20 being maintained at a suitable level such as that indicated at 29, or below the bottom margin of the opening 21, it is therefore apparent that no cream can pass through the vat 20 without passing through the wire mesh of the cylinder 14; and accordingly this mesh is of such a degree of fineness as will effectively intercept any objectionable foreign matter, such as curd, sediment and other impurities, and carry all such substances up into the path of the steam jet issuing from the jet opening provided by the slit 45 of the steam pipe terminal 44. The force of this steam jet effectively clears the wire mesh of all clinging matter and discharges it into the trough or receptacle 46,—thus leaving the wire screen mesh fresh and clean before passing again below the spout 12 for repeating the screening operation. The trough or receptacle 46 is constantly drained by virtue of its sloping bottom and the discharge outlet 50, and kept clean by the action of the steam jet nozzle 60, and the output from said receptacle re-screened by the strainer 52, which is removed frequently to dispose of the foreign matter that has been separated and collected by the operation of the apparatus.

It will therefore be apparent that a practical and highly efficient method or process has been devised for the carrying out of the aforesaid objects of my invention. The outstanding feature of advantage is the fact that the cream is carried through the proper steps for cleaning and straining the same before it is subjected to any pumping or pressure-straining operation,—thereby avoiding any macerating and disintegrating effects of such pumping and pressure conditions which only leave a considerable portion of such foreign matter and objectionable impurities still entrained in such a finely divided state that they can no longer be strained and removed by any ordinary mechanical means. By the improved method, this foreign matter is removed in the initial treatment of the cream, or at the very outset when it can be most effectively handled by an appropriate screening and mechanical straining action, so that the impurities are all removed before any pumping operations are carried on in the later treatment of the cream by the usual dairy or creamery equipment.

I am aware that screening devices of a somewhat similar nature have heretofore been employed for the separation of impurities from liquids of a different character and in other arts entirely foreign to the creamery and dairy field; but so far as I am aware the herein described method of straining and removing the foreign matter from cream is entirely new in dairy and creamery operations. Moreover, while I have herein shown and described what I have found to represent a suitable and highly satisfactory mode of practising the invention, by means of apparatus which I contemplate claiming in a separate application, I desire to be understood as expressly reserving the right to make whatever changes or modifications may fairly be deemed to fall within the spirit or scope of the appended claim to my improved process.

Having thus described my invention, what I claim as new and desire to secure by Letters-Patent is:—

The dairy and creamery process which consists in subjecting the cream, prior to the treatment of the cream by any pressure-straining process in the plant, to a cleaning and purifying action by first warming the cream to a free-flowing consistency and then allowing it to flow by gravity through a screening means for removing the curd, sediment and other foreign matter from the cream.

CECIL E. HARROW.